US012280393B2

(12) United States Patent
Cooper et al.

(10) Patent No.: US 12,280,393 B2
(45) Date of Patent: Apr. 22, 2025

(54) POROUS FABRIC OR SLEEVE COVERING FOR PAINT ROLLER COVER

(71) Applicant: COLUMBIA INSURANCE COMPANY, Omaha, NE (US)

(72) Inventors: Glen Cooper, East Hanover, NJ (US); Gary Dandreaux, River Edge, NJ (US); William Somers, Randolph, NJ (US); Rita Desai, Parsippany, NJ (US); Stefanie Iannacone, Sparta, NJ (US); Clarena Shavel, East Stroudsburg, DE (US); Dimitri Zafiroglu, Centreville, DE (US)

(73) Assignee: Columbia Insurance Company, Omaha, NE (US)

( * ) Notice: Subject to any disclaimer, the term of this patent is extended or adjusted under 35 U.S.C. 154(b) by 776 days.

(21) Appl. No.: 17/259,384

(22) PCT Filed: Dec. 10, 2019

(86) PCT No.: PCT/US2019/065335

§ 371 (c)(1),
(2) Date: Jan. 11, 2021

(87) PCT Pub. No.: WO2020/131476

PCT Pub. Date: Jun. 25, 2020

(65) Prior Publication Data

US 2021/0387227 A1 Dec. 16, 2021

Related U.S. Application Data

(60) Provisional application No. 62/782,813, filed on Dec. 20, 2018.

(51) Int. Cl.
*B05C 17/02* (2006.01)
*D04B 1/16* (2006.01)
*D04B 21/16* (2006.01)

(52) U.S. Cl.
CPC ........... *B05C 17/0207* (2013.01); *D04B 1/16* (2013.01); *D04B 21/165* (2013.01)

(58) Field of Classification Search
CPC .......... B05C 17/0207; B05C 17/02–04; D04B 21/165; D04B 21/18
(Continued)

(56) References Cited

U.S. PATENT DOCUMENTS 4,773,238 A 9/1988 Zafiroglu
5,138,738 A 8/1992 Nicholson
(Continued)

FOREIGN PATENT DOCUMENTS

EP 1419726 B1 5/2004
FR 2533464 A1 * 3/1984
(Continued)

OTHER PUBLICATIONS

Translation of JP2012250184A (Year: 2012).*
(Continued)

*Primary Examiner* — Tom Rodgers
(74) *Attorney, Agent, or Firm* — The H.T. Than Law Group

(57) ABSTRACT

A thin highly-open fabric or sleeve is placed over a paint roller cover, allowing the flow of paint in and out of the roller cover and smoother paint films.

23 Claims, 7 Drawing Sheets

(58) Field of Classification Search
USPC ........................................................ 15/230.11
See application file for complete search history.

(56) References Cited

U.S. PATENT DOCUMENTS

| | | | | |
|---|---|---|---|---|
| 5,192,600 | A | | 3/1993 | Pontrelli et al. |
| 5,305,492 | A | | 4/1994 | Giuliani et al. |
| 5,623,888 | A | | 4/1997 | Zafiroglu |
| 5,855,715 | A | * | 1/1999 | Langford ............ B05C 17/0207 156/279 |
| 5,966,902 | A | | 10/1999 | Korycki |
| 6,389,637 | B1 | | 5/2002 | Hurell |
| 6,681,434 | B2 | | 1/2004 | Smith |
| 6,701,567 | B2 | | 3/2004 | Smith |
| 6,705,792 | B2 | | 3/2004 | Smith |
| 6,745,434 | B2 | | 6/2004 | Smith et al. |
| 7,008,133 | B2 | | 3/2006 | Ashe et al. |
| 7,036,197 | B2 | | 5/2006 | Zafiroglu et al. |
| 7,458,128 | B2 | | 12/2008 | Smith et al. |
| 7,537,111 | B2 | | 5/2009 | Hart et al. |
| 7,694,379 | B2 | | 4/2010 | Glaug |
| 7,815,825 | B2 | | 10/2010 | Funaoka et al. |
| 7,927,430 | B2 | | 4/2011 | Hart et al. |
| 7,962,993 | B2 | | 9/2011 | Glaug |
| 8,026,408 | B2 | | 9/2011 | Glaug |
| 8,250,701 | B1 | | 8/2012 | Forsline et al. |
| D759,925 | S | | 6/2016 | Martens |
| 9,682,399 | B2 | | 6/2017 | Utterback |
| 2006/0054527 | A1 | | 3/2006 | Hart et al. |
| 2006/0111006 | A1 | | 5/2006 | Zafiroglu et al. |
| 2009/0205980 | A1 | | 8/2009 | Hart et al. |
| 2017/0073094 | A1 | | 3/2017 | Hall |

FOREIGN PATENT DOCUMENTS

| | | | | |
|---|---|---|---|---|
| GB | 2255900 | A | | 11/1992 |
| JP | 2012250184 | A | * | 12/2012 |

OTHER PUBLICATIONS

Translation FR2533464A1 (Year: 1984).*

International Search Report and Written Opinion issued in connection with the corresponding international application No. PCT/US2019/065335 on Feb. 18, 2020.

Westlaw Search.

Extended European Search Report issued in connection with the corresponding European Application No. 19900899.6 1 on Sep. 8, 2022.

"Standard Test Methods for Stretch Properties of Fabrics Woven from Stretch Yarns". ASTM International. D3107-07 (2019). West Conshohocken, PA. www.astm.org.

* cited by examiner

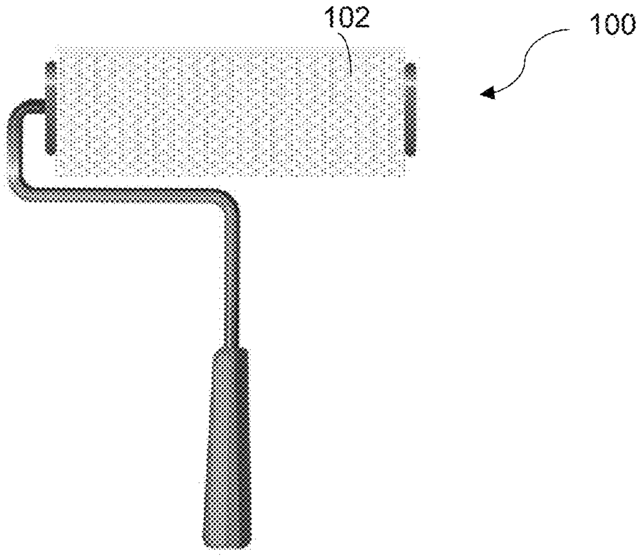
Figure 1(a) (conventional)

POROUS FABRIC OR SLEEVE COVERING FOR PAINT ROLLER COVER

CROSS-REFERENCE TO RELATED PATENT APPLICATION

The present international patent application claims priority to U.S. provisional application No. 62/782,813 entitled "Porous Fabric or Sleeve Covering for Paint Roller Cover," filed on 20 Dec. 2018. The parent provisional patent application is incorporated herein by reference in its entirety.

FIELD OF THE INVENTION

The present invention relates to a thin and porous fabric or sleeve covering paint roller covers.

BACKGROUND OF THE INVENTION

Conventional paint roller covers typically have an absorbent layer wrapped around a cardboard or plastic hollow core. The absorbent material can be a textile, such as a woven, non-woven, stitch-bonded, tufted, knit, other fabrics, a synthetic pile, or a relatively thick porous material such as a woolen or synthetic felt. Roller covers can also be made from porous sponges. Typically, the absorbent layers have a thickness of either % inch or 1% inch. The hollow core of the roller covers is inserted into an outwardly bulging wire frame, which presses against the inside surface of the hollow core and acts as a spring to retain the roller cover in place. The wire frame is rotatably attached typically at a right angle to a handle for the painters to apply paints on a substrate such as a wall.

Rollers can leave behind on the painted surface an uneven texture that challenges the paints' ability to evenly spread itself on the substrate and to smooth out the textured surface. The raised fibrous surface, however, can develop an uneven texture as the raised fibers group into bundles. The wet surface of the roller covers may form clumps that prevent the surface of the roller covers from depositing a uniform paint film. Some conventional roller cover materials that can apply a smoother wet paint film typically apply a thinner paint film thereby reducing the hiding power of the paint film or the ability to hide the colors and/or markings under the painted surface. Furthermore, the roller covers may shed and leave shed fibers or particles of foam on the painted surface.

Roller covers can also unwittingly pick up wet paint from painted surfaces, if the roller covers are rolled over freshly painted surfaces and the roller covers are under-saturated with paints. This most often happens when the roller cover is re-rolled over a freshly painted area after depositing most of the paint stored within its absorbent material.

U.S. Pat. No. 5,138,738 discloses using a bag mounted around the bristle head of a paint brush. This reference lists a number of generic fabrics that can be used to make the bag, including hosiery or panty hose material, which "has been found to provide excellent all-round use results." Hosiery materials are known to be elastic and significantly stretchable in all directions. The reference also indicates that cheesecloth-like materials can also be used. Cheese cloths are structurally weak materials and can be stretched in diagonal directions without the ability to return to its original dimensions and without the ability to hold its shape. The threads or yarns that are weaved to make the cheesecloths are not bonded at their intersections, and can easily slip in relative to each other, rendering the cheesecloths structurally weak. Moreover, cheese cloths are hydrophilic and absorb water and aqueous based paints.

The present inventors have found that materials, such as hosiery that are easily and significantly stretchable in all directions when installed over a paint roller, lack the structural integrity to resist being stretched by the rolling friction and the weight and viscosity of wet paints, particularly in the direction circumferentially around the roller covers. Hosiery materials can stretch a significant amount on a wet roller cover to the point where the hose sags and/or folds over itself and leaves marks on the painted surfaces. Conversely, elastic hosiery materials installed over a paint roller under high stretch can compress the absorbent layer, which is normally highly compressible in order to allow the easy absorption and release of paint and causes the loss of absorbent volume. On the other hand, an inelastic, but highly stretchable such as a weak cheese cloth, if applied as is to the surface of a roller cover and fitting loosely over the roll, presents problems such as slipping and deformation, detracting from the uniformity a paint application. Furthermore, cheese-cloth materials are made from cotton and cotton fibers can be readily separated from the chees-cloths and deposited on the paint films.

Hence, there remains a need to improve the quality of paint films that are deposited onto a surface with paint roller covers.

SUMMARY OF THE INVENTION

An aspect of the present invention relates to a porous sleeve covering for a paint roller cover having a circumferential direction and a longitudinal direction, said porous sleeve comprises a fabric material having a stretch in the circumferential direction of less than about 35% at a load of 2 kgf/5 cm, a stretch in the longitudinal direction of less than about 125% at a load of 2 kgf/5 cm, a porosity of greater than about 30%, and a thickness from about 0.15 mm to about 0.65 mm.

Alternatively, the stretch in the circumferential direction is less than about 30% at a load of 2 kgf/5 cm, less than about 25% at a load of 2 kgf/5 cm, less than about 15% at a load of 2 kgf/5 cm, or less than about 10% at a load of 2 kgf/5 cm. Alternatively, the longitudinal direction is less than about 100% at a load of 2 kgf/5 cm, less than about 75% at a load of 2 kgf/5 cm, or less than about 60% at a load of 2 kgf/5 cm. Alternatively, the porosity is more than about 40%, or more than about 50%. Alternatively, the thickness is from about 0.20 mm to about 0.51 mm or from about 0.20 mm to about 0.38 mm.

In another embodiment, a diagonal stretch of the fabric material is preferably from about 30% to about 75%, preferably from about 35% to about 70% and more preferably from about 40% to about 55% at a 2 kgf/5 cm load. In yet another embodiment, a basis weight of the fabric material is preferably between about 10 about 30 $g/m^2$, preferably between about 12 and about 28 $g/m^2$, or preferably between about 15 and 25 $g/m^2$.

Preferably, the fabric material is synthetic, polymeric or non-natural. Preferably the fabric material is hydrophobic. Preferably, the fabric material comprises continuous filament fibers.

In another embodiment, the fabric material is selected from a group consisting of a knit sock; a knit sleeve; a continuously formed plastic mesh tube; a porous open foam tube; a tubular mesh of diagonally positioned or crossed yarns meshing; a woven; a knit; a cross-over-bonded fabric;

a perforated film; a perforated nonwoven; and a stitched bonded pattern with or without a nonwoven substrate.

Alternatively, the circularly-knit sock is formed with a knit diameter and a knit pattern that allows the sock to expand in diameter as it is being pulled over the paint roller cover, approaching its circumferential stretch limit. Alternatively, the knit sock is arranged for the looping frequency in the knit in the circumferential direction to be larger than the frequency in the longitudinal direction. Alternatively, the knit sleeve has different looping frequencies than after it is finished by heat-setting. Alternatively, the woven or knit has at least one of the repeating spaces in one direction with a frequency higher than 4/inch for a woven fabric or a knit fabric. Alternatively, the stitched bonded pattern with or without a nonwoven substrate includes at least one of a chain, a ripple, a tricot or a warp stitch or combinations thereof.

In another embodiment, the fabric material is formed in situ on the paint roller cover.

In yet another embodiment of the present invention is directed to a combination of the paint roller cover and a porous sleeve described and claimed herein installed on the paint roller cover. The nap of the paint roller cover can have a thickness of about 9.5 mm (% inch) or about 12.7 mm (½ inch).

BRIEF DESCRIPTION OF THE DRAWINGS

In the accompanying schematic drawings, which form a part of the specification and are to be read in conjunction therewith and in which like reference numerals are used to indicate like parts in the various views:

FIG. 1(*b*) illustrates a sleeved paint roller cover according to the present invention.

DETAILED DESCRIPTION OF THE PREFERRED EMBODIMENTS

Figure 1B:
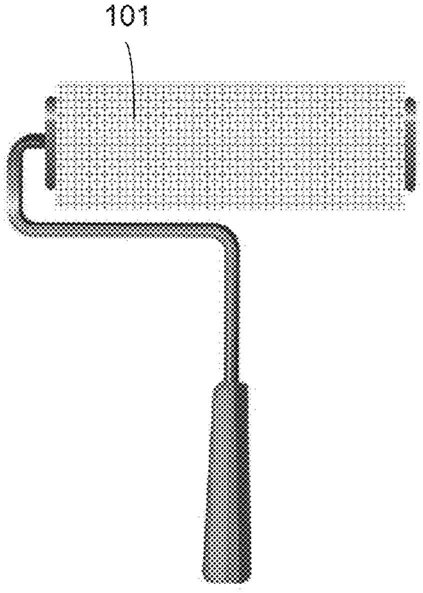
FIG. 1(*a*) illustrates a conventional paint roller cover.
Figure 2A:
FIGS. 2(*a*)-(*d*) are photographs of roller covers with a sleeve covering the roller covers.
Figure 2B:
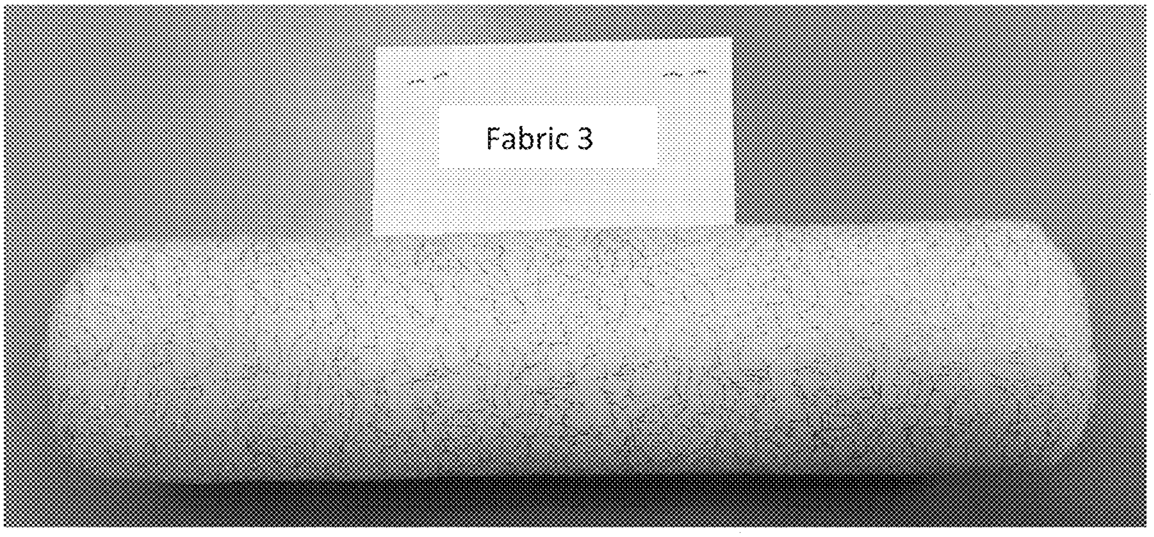
Figure 2C:
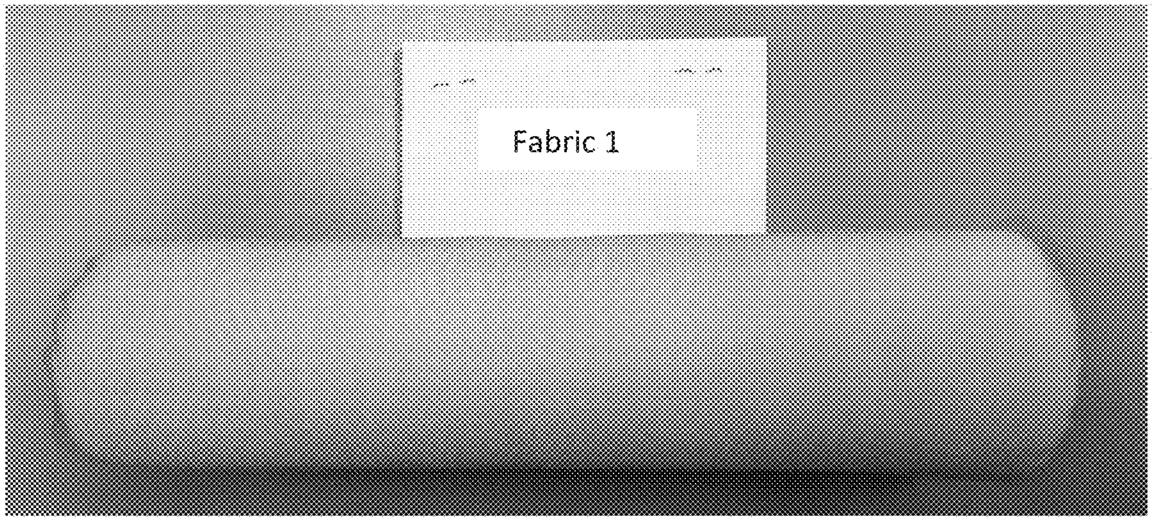
Figure 2D:
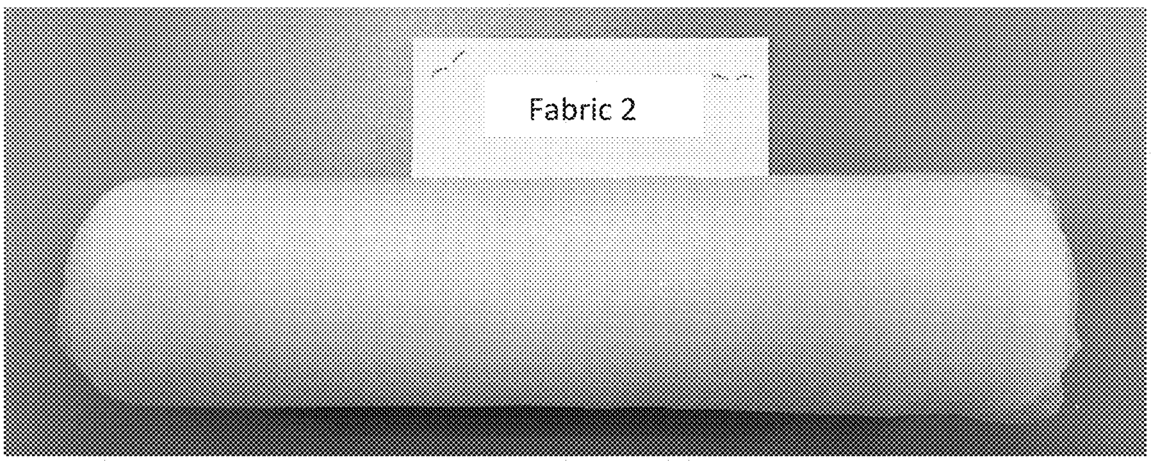

One aspect of the present invention is directed to a thin and highly porous sleeve securely installed over a paint roller cover applying a minimum of radial pressure over the cover, and yet continuously engaging the surface of the roller cover and maintaining an even interface during the paint rolling process without impeding the flow of paint into and out of the roller surface. In other words, the sleeve helps maintain the fibers in the roller cover in a substantially upright fashion and helps minimizing the tendency for the fibers in the roller covers to clump to each other. The roller cover is attached to a roller frame and handle and used in the conventional fashion.

The present invention includes but is not limited to the sleeve or fabric adapted to cover the roller cover as described herein, and a combination of the roller cover and said sleeve or fabric installed thereon.

The inventive sleeve may optionally radially expand to be mounted or installed onto the roller cover, or it may take advantage of the radial compressibility of the absorbent layer or nap of the roller cover to be pulled over the roller cover as it is installed over the roller cover and continuously engages the surface of its absorbent layer. After mounting, the sleeve is preferably essentially substantially non-stretchable in the circumferential direction around the roller cover by the stresses generated during the painting process. The mounting process preferably does not compress the roller cover to a significant degree, and the total thickness of the absorbent layer or nap, including the sleeve, remains essentially unchanged.

In one embodiment, the inner surface of the sleeve may have openings, projections or a roughness that engages the surface of the absorbent layer and generates sufficient friction to avoid relative displacement between the sleeve and the surface of the absorbent layer during the paint rolling application. In another embodiment, the sleeve is optionally partially attached to the roller surface with regular or pressure sensitive adhesive without interfering with the flow of paint.

In another embodiment, the invention is directed to methods of producing the sleeve in an efficient and economical manner taking advantage of a variety of textile or nontextile processes.

In yet another embodiment, the invention is also directed to methods of installing a pre-manufactured sleeve over the paint roller.

The invention is also directed to methods of forming an equivalent virtual sleeve on the surface of the roller in situ with or without adding material for the sleeve.

These and other objects of the various embodiments of the present invention are realized by using a thin and highly porous sleeve, comprising:

(a) a fine pattern of openings or roughness engaging the surface of the absorbent layer, (b) a limited level of residual circumferential stretch as installed onto the roller cover, sufficient to allow the sleeve to be held over the thick and absorbent outer layer of the roller cover, and to accommodate the deformation of the periphery as the roller cover presses and moves against a painted surface, (d) a high level of porosity, and (e) a minimum level of thickness Beyond the needed low level of circumferential stretch, the sleeve material tightens, and does not allow further stretch as it is subjected to circumferential stress by the rolling friction or by the weight of absorbed paint. The sleeved roller surface remains smooth and flat as the paint is applied.

One aspect of the present invention is directed to a thin and porous sleeve (101) that is positioned over and wraps around a conventional paint roller cover (100) with an outer absorbent layer or nap (102) wrapped around a hollow core, as shown in FIGS. 1(*a*)-(*b*). The inventive sleeve serves as a conduit for wet paint to flow therethrough and to be stored within the absorbent layer (102) and for wet paint to go in the opposite direction to be deposited onto the surface to be painted. The inventive sleeve (102) does not itself store a significant amount of wet paint.

Commercial roller wraps generally have a % inch nap and a 1% inch nap or thickness. The thicker ½ inch nap roller wraps are generally used to paint textured or rough wall surfaces. The roller covers are about 9-inch (22.9 cm) long and the other general dimensions of the roller wraps are as follows:

| | ½ inch nap | ⅜ inch nap |
|---|---|---|
| Inner Diameter of core | 1.5 inch | 1.5 inch |
| Outer Diameter (incl. nap) | 2.5-2.625 inch | 2.25-2.375 inch |
| Circumference | 7.85-8.25 inch | 7.069-7.46 inch |

Due to the fluffiness of the nap and due to the variance of manufacturing techniques used by different manufacturers, the outer diameter and therefore the circumference vary slightly as shown above.

The present inventors have conducted a series of experiments, wherein a number of fabrics are formed into sleeves and are positioned over roller covers. The sleeved roller covers are then used to coat a surface with paints and the results are compared to the un-sleeved conventional roller wraps. The selected fabrics were (i) Fabric 1, (ii) Fabric 2, (iii) Fabric 3 and (iv) Fabric 4. These fabrics are commercially available at retail fabric stores.

FIGS. 2(*a*)-(*d*) are photographs of each of these four fabrics being mounted onto roller covers. The fabrics as purchased appeared to have been heat-set after knitting, with the heat set knit loops spaced with a lower frequency in a first direction, e.g., the longitudinal direction, vs. the second direction perpendicular to the first direction, e.g., the transverse direction, and having a higher stretch level in the second direction.

As placed over the roller covers, the sleeves were slightly elongated along longitudinal or axial direction, thereby reducing the stretchability longitudinally and increasing slightly the stretchability in the circumferential direction. In all cases, it was observed that the sleeves were secured on the roller covers with the overall sleeved diameter being approximately the same as the original un-sleeved diameter of the roller covers, indicating a very small level of stress between the roller cover and the inventive sleeve. It was further observed that placing these fabrics over the roller covers with a small compression from about 10 mils (0.010 inch or 0.254 mm) to about 50 mils (0.050 inch or 1.27 mm) was sufficient to secure the fabrics to the roller covers, as to minimize and preferably to prevent relative movements between the fabrics/sleeves and the roller covers. It is noted that 1 mil=0.0254 mm or 25.4 µm.

Figure 3:
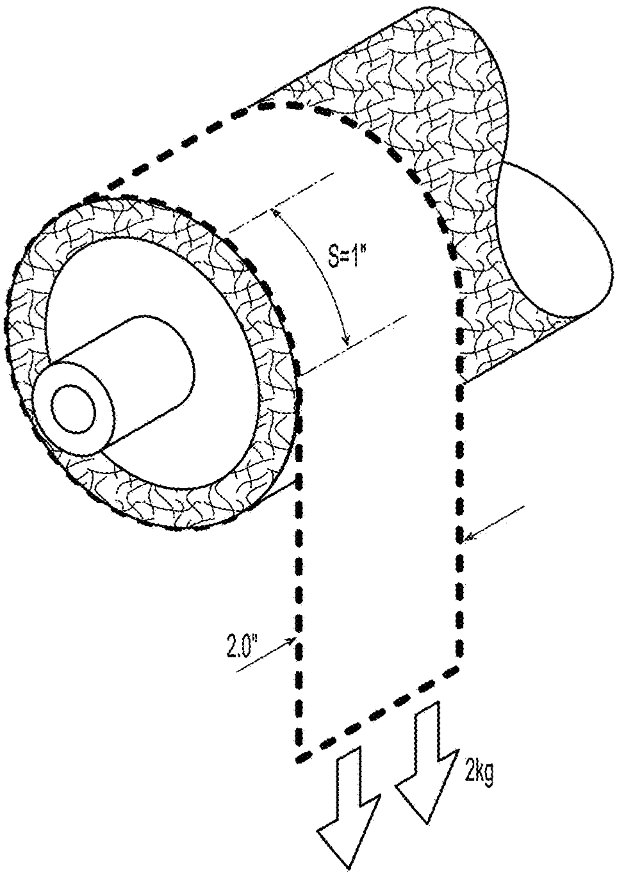
FIG. 3 illustrates a test set-up to determine if a porous sheet can engage a paint roller and stabilize the roller surface.

To demonstrate that the fabrics were capable of engaging and stabilizing the roller cover without constricting it, a 5 cm (about 2.0 inch) wide strip of each fabric was wrapped with minimum tension applying minimum pressure around the roller cover, but less than the full 3600, without reducing the roll diameter, as shown in FIG. 3. The loose end was then pulled tangentially with a weight (force) of 2 kg, which resulted in a pressure of 2 kg per 5 cm. The strip of fabric stayed securely around the roller and did not slide off the roller. A 2.5 cm (about 1.0 inch or 1,000 mils) segment "S", shown in FIG. 3, adjacent to the tangent load expanded less than a visible amount, i.e., less than about 50 mils, indicating that the fabric allows a very small amount of stretch on the roller surface, under 50/1,000, or under 5%, with a pressure of 2 kg/5 cm. The tangential frictional rolling friction force or the force generated by a loaded paint roller cover is expected to be significantly smaller than 2 kg/5 cm, or 9 kg for a 22.9 cm (about 9 inch) wide roller. This estimation predicts that the sleeves would not slide relative to the roller covers during the application of paints on substrates.

The results of the experiments conducted using the four fabrics illustrated in FIGS. 2(*a*)-(*d*) are shown below.

| Sleeve Material | Construction Method | Contrast Ratio (C/R) |
|---|---|---|
| Control ⅜ inch No Sleeve | n/a | 0.9504 |
| Pali Casa Tulle Baltic ("Blue") | ⅜ inch glued | 0.9864 |
| | ½ inch glued | 0.9847 |
| | ⅜ inch spray glued | 0.9781 |
| | ⅜ inch stitched | |
| Wyla Rb Lp Micro White ("Micro") | ⅜ inch glued | 0.9782 |
| | ½ inch glued | 0.9727 |
| | ⅜ inch spray glued | 0.9605 |
| | ⅜ inch stitched | |
| Cosm Sparkle Mesh Silver ("Silver") | ⅜ inch glued | 0.9725 |
| | ½ inch glued | 0.9699 |
| | ⅜ inch spray glued | failed |
| | ⅜ inch stitched | 0.9743 |
| Side Glitter Tulle Bright White ("Glitter") | ⅜ inch glued | 0.9810 |
| | ½ inch glued | |
| | ⅜ inch spray glued | |
| | ⅜ inch stitched | |

As described, the fabrics are cut into sections that can wrap around the roller cover with a small overlap to ensure coverage around the circumference of the roller cover to form a sleeve. The two ends of the sleeve are tucked into the open ends of the hollow core. Spray glued means that a glue is lightly sprayed over the surface of the roller cover and the fabrics are rolled on to the sprayed surface. Glued means only the overlaps are glued. Stitched means that the overlaps are sewn together.

The contrast ratio (C/R) is measured on paint films on sheet rock dried overnight with a spectrophotometer. Contrast ratio is a measurement of the hiding power (or opacity) of a paint. C/R is measured in accordance with ASTM D2085-88 "Standard Test Method for Hiding Power of Paints by Reflectometry." A C/R of at least 95% (0.9500) of each coat is considered acceptable. The overall C/R of at least 99%, and more preferably 99.5%, is considered acceptable for two or more coats of dry film.

The baseline C/R is 0.9504 for the control ⅜ nap roller cover is improved significantly when an inventive sleeve covers the roller cover. The fabric 1 shows the most improved C/R. As shown, all the sleeves have improved the hiding power of the paint films over the control.

Hence, all four tested fabrics tested are suitable for the inventive sleeves. Their properties are measured as follows†.

| | Blue | Micro | Silver | Glitter | Hosiery (conventional) |
|---|---|---|---|---|---|
| Thickness (mils/mm) | 9/0.23 | 8/0.20 | 2.0/0.51 | 9/0.23 | 22/0.56 |
| Basis Weight (g/m$^2$) | 18 | 16 | 23 | 15 | 15 |
| Stretch (%) (2 kg/5 cm) (MD/XD)‡ | <5/100 | 25/60+ | 0/70+ | 5/100+ | 85/180 |

-continued

| | Blue | Micro | Silver | Glitter | Hosiery (conventional) |
|---|---|---|---|---|---|
| Stretch (%) (1 kg/5 cm) (MD/XD) | ~0/22 | 10/30 | 0/45 | ~0/65 | 50/120 |
| Stretch (%) (2 kg/5 cm) (diagonal direction) | 53 | 40 | 37 | 55 | 153 |
| Porosity (%) | 64% | 35-40% | 65% | 65% | 19% |
| Openings per inch | 32/42 | 36/44 | 7/21 | 7/16 | 139/150 |
| Openings per cm (MD/XD) | 12.6/16.5 | 14.2/17.3 | 2.8/8.3 | 2.8/6.3 | 54.7/59.1 |
| Stretch (%) (2 kg/5 cm) on roller cover (FIG. 3) (MD/XD) | <5/15 | <5/15 | <3/25+ | ~0/15 | slips |
| Stretch (%) (1 kg/5 cm) on roller cover (FIG. 3) (MD/XD) | ~0/10 | ~0/10 | 0/10 | 0/5 | slips |

†: measurements of fabrics in relaxed state, i.e., away from roller covers, except as otherwise indicated, e.g., measurements according to FIG. 3.
‡some fabrics may lock up at this load, i.e., reaching its maximum stretch.
+about 5 units or less above the reported number.
MD: machine direction—this direction is parallel to the direction that the fabric was manufactured and rolled into bolts. MD was identified by viewing the edges of the fabric. The edges that are denser than the rest of the fabric are in MD, since these edges are outside the heat-setting pin rollers.
XD: cross direction—direction perpendicular to MD.

MD: machine direction—this direction is parallel to the direction that the fabric was manufactured and rolled into bolts. MD was identified by viewing the edges of the fabric. The edges that are denser than the rest of the fabric are in MD, since these edges are outside the heat-setting pin rollers.

XD: cross direction—direction perpendicular to MD.

Thickness is measured by a standard micrometer. Basis weight is a standard way to describe an area-type density in the textile art and is reported in grams/square meter. Measurements under 5% represent the best estimates due to the limits of the instruments at low stretches. The percentage stretch measurement is the percentage of stretched length over the original length. In one example, on a 5 cm wide strip of fabric a 1-inch section is marked with a tool, such as a caliper, and a known weight, e.g., 1 kg or 2 kg, is applied to one end. For small stretches, a 50 mil (or 30 mil) distance is marked and an observation is made to see if 5% (or 3%) stretch is met. Longer stretches can be directly measured by a caliper.

Figure 4:
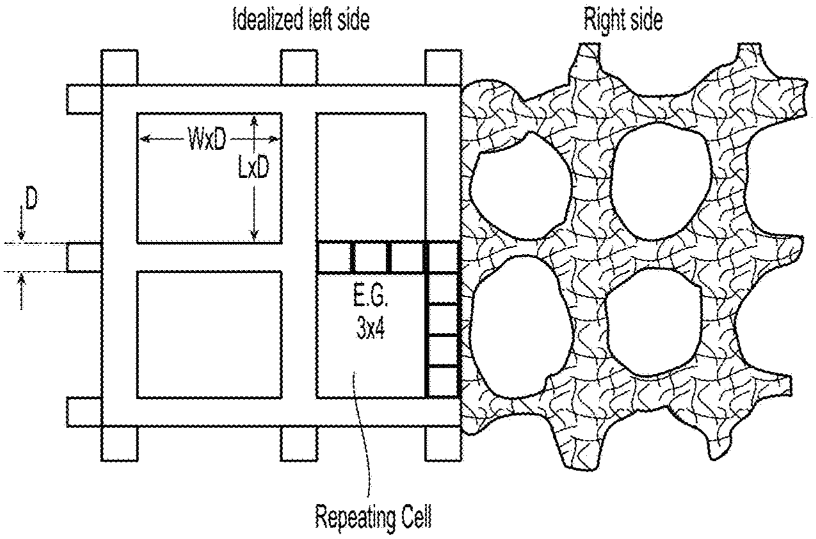
FIG. 4 illustrates the repeating cell method for ascertaining porosity.

Porosity is measured using a "repeating cell" technique, as illustrated in FIG. 4. An approximate diameter (D) for the fibers in a fabric is determined and assigned as the basic unit, and an open space is defined as length (L) times width (W). L and W are expressed in terms of number of D units. For example, repeating cell (110) in FIG. 4 has 4 D units in the horizontal direction and 5 D units in the vertical direction with the corner piece counts in both horizontal and vertical directions. In repeating unit (110), the open space is 3D×4D or 12 D units and the closed space is 3 D units+4 D units+1 D (corner piece) or 8 D units. Hence, the porosity is 12 D÷(12 D+8 D)=about 60%.

The left side of FIG. 4 shows an idealized fabric with substantially rectangular shaped pores or holes. While some fabrics may resemble the idealized fabric, others are not. The right side of FIG. 4 illustrates a scenario where the intersections of fibers have a higher thickness and the shaft portions have a lower thickness. Fabric 2 resembles this scenario and as shown in the table below its "L" distance is estimated at 1.5 or 2 D units.

| | W | L | Open | Closed | Total | Open/Total | Porosity |
|---|---|---|---|---|---|---|---|
| Glitter | 3 | 6 | 18 | 10 | 28 | 0.643 | 65% |
| Blue | 4 | 4 | 16 | 9 | 25 | 0.64 | 64% |
| Silver | 3 | 6 | 18 | 10 | 28 | 0.643 | 65% |
| Micro | 1.5 | 1.5 | 2.25 | 4 | 6.25 | 0.36 | 35% |
| Micro | 1.5 | 2 | 3 | 4.5 | 7.5 | 0.4 | 40% |
| Hosiery (conventional) | 0.7 | 0.7 | 0.49 | 2.4 | 2.89 | 0.189 | 19% |

Based on the above data and results, suitable fabrics usable to construct the inventive sleeve preferably have one or more of the following properties:

Stretch in one direction, e.g., the machine direction, preferably less than about 35%, preferably less than about 30%, less than about 25% or less than about 15% or less than about 10% at a load of 2 kg/5 cm. Preferably, this direction is the circumferential direction on the roller cover.

Stretch in the other direction, e.g., transverse direction, preferably less than about 125%, preferably less than about 100% or less than about 75% or less than about 60% at a load of 2 kg/5 cm. Preferably, this direction is in the longitudinal or axial direction on the roller cover.

Porosity preferably greater than about 30%, preferably more than about 40% or more than about 50%, preferably as measured by the repeating cell method.

Basis weight preferably between about 10 about 30 g/m$^2$, preferably between about 12 and about 28 g/m$^2$, or preferably between about 15 and 25 g/m$^2$.

Thickness preferably between about 6 mils (0.15 mm) and about 25 mils (0.64 mm), preferably between about 8 mils (0.20 mm) and 20 mils (0.51 mm), preferably between about 8 mils (0.20 mm) and 15 mils (0.38 mm).

A coefficient of friction preferably sufficient to resist slipping when the fabric or sleeve is placed around and in contact with the roller cover at a load of 1 kg/5 cm, more preferably at a load of 2 kg/5 cm.

Stretch in the diagonal direction, which is a combination or aggregate of stretches in the MD and XD directions, preferably from about 30% to about 75%, preferably from about 35% to about 70% and more preferably from about 40% to about 55% at a 2 kg/5 cm load.

The inventive sleeve preferably does not substantially compress the paint roller cover so that the roller cover's original volume and ability to hold or store paints is not significantly affected. After it is mounted over the absorbent layer or nap (102), the inventive sleeve preferably does not substantially stretch further in the circumferential direction, e.g., the direction around the roller cover and substantially perpendicular to the longitudinal or axial axis of the roller cover.

Preferably, the circumference of the formed sleeve is substantially non-stretchable by the tangential stresses generated by rolling action or the weight of paint temporarily contained within the absorbent layer (102). Optionally, before installation the sleeve may have a smaller diameter, e.g., less than bout 50 mils or 0.050 inch or 1.27 mm, to avoid over-compressing the absorbent layer (102) and substantially reducing its paint holding capacity, but it is elastically stretchable to allow fitting over the cover, and substantially the inventive sleeve is no further stretchable by the stresses generated by rolling action or the weight of contained paint.

After installation over the roller cover, the sleeve material preferably locks up to the fibers in the roller covers, and requires a relatively high level of stress, estimated to be higher than about 2 kg per 5 cm of width (or about 2 kg/2 inch), which is about 9 kg (19.8 lbs.) over the entire length of the roller cover and which is unlikely to be produced by rolling friction or contained paint weight, in order to stretch further in the circumferential direction. As used herein, kilogram (kg) and pounds (lbs.) are the units of weight or force commonly used in daily life and not the unit of mass used scientifically. For example, a person weighs 150 pounds or 68 kilograms. In other words, a kilogram used herein is a kilogram force (kgf), which is equaled to the weight of a kilogram mass on the surface of earth. 1 kgf=9.8 Newtons.

The present inventors have found that the relative rigidity in the circumferential direction allows the sleeve to resist stretching and to maintain a uniform spatial relationship to the roller cover. Moreover, preferably the sleeve should be able to repeatedly return to within a 0%-10%, 1%-5% or more preferably 2%-4% percent of its original circumferential length after repeated stretching, in order to avoid loosening after being deformed by repeated rolling, or accidental deformation.

Furthermore, fabrics suitable for the inventive sleeve, such as Fabrics 1-4, preferably are prepared with continuous synthetic or polymeric or non-natural (such as cotton or wool) fibers. Suitable fabrics are also preferably hydrophobic or preferably do not absorb aqueous paints.

Figure 5A:
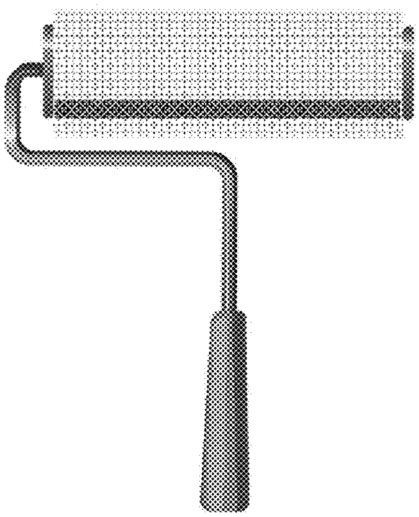
FIGS. 5(*a*)-(*b*) illustrate embodiments of the inventive sleeve.
Figure 5B:
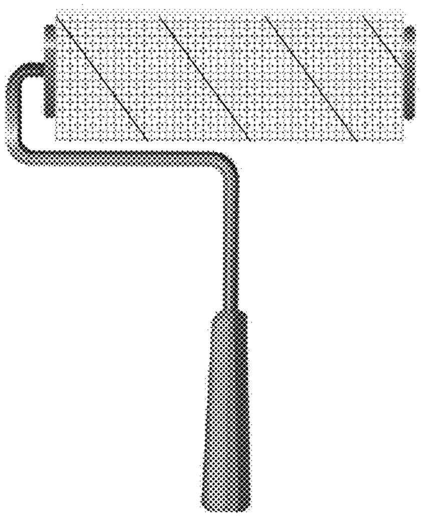

The inventive sleeve can be manufactured in a direct tubular form, such as a sock with one closed end, as shown in FIG. 1(*b*), or it can be formed by using a thin porous and flat sheet, wrapping the sheet around the roller cover and joining the axially cut ends of the sheet as shown in FIG. 5(*a*). The seam or joint may also be sewn together. The seam or joint across may be an overlapped seam or a butted seam. Because of the very small thickness of the sheet compared to the depth of the absorbent layer, the roller is unlikely to leave seam marks on the painted surface. Alternately, the sleeve can be formed by diagonally wrapping strips of a flat porous material around the roller and affixing the cut ends as shown in FIG. 5(*b*). Seaming along the diagonal edges may or may not be necessary as frictional contacts between the wrapping strip and the absorbent materials may be sufficient to hold the strip in place.

In a direct tubular form, the sleeve may consist of a circularly-knit sock formed with a knit diameter and a knit pattern that allows the sock to expand in diameter as it is being pulled over the roller, approaching its circumferential stretch limit in the process. In a knit sock, one way of preparing the sock is to arrange for the looping frequency in the knit in the circumferential direction to be larger than the frequency in the axial/longitudinal direction. The knit sleeve as knit may have different looping frequencies than after it is optionally finished by heat-setting, and still different looping frequencies as installed on the roller covers. The relative adjustability of these properties is well known in the knitting or sock or hose-making art.

In other direct tubular forms the sleeve may consist of a continuously formed plastic mesh tube, a very porous thin open-foam tube, or a tubular mesh of diagonally positioned or crossed yarns meshing and overlaid over a mandrel and joined at their intersection points, and other similar constructions. Preferably, these constructions are set diagonally so that they allow the redistribution of axial and circumferential stretch, to facilitate meeting the requirements of the present invention.

Figure 6:
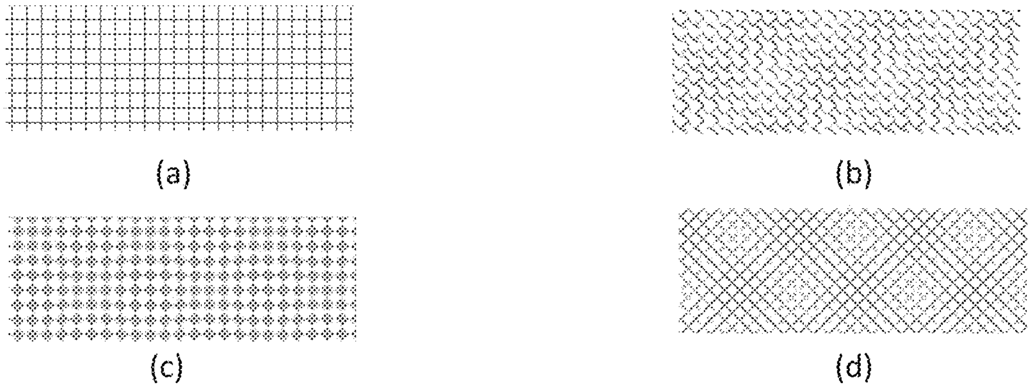
FIGS. 6(*a*)-(*d*) illustrate exemplary fabrics suitable for the inventive sleeve.

The fabrics suitable for forming the inventive sleeve or tube can be a woven, knit, or cross-over-bonded fabric wherein at least one of the repeating spaces in one direction has a frequency higher than 4/inch for a woven fabric (FIG. 6(*a*)), for a knit fabric (FIG. 6(*b*)), or a perforated film or perforated nonwoven (FIG. 6(*c*)), or for a crossed and over-bonded array of yarns (FIG. 6(*d*)).

Figure 7A:
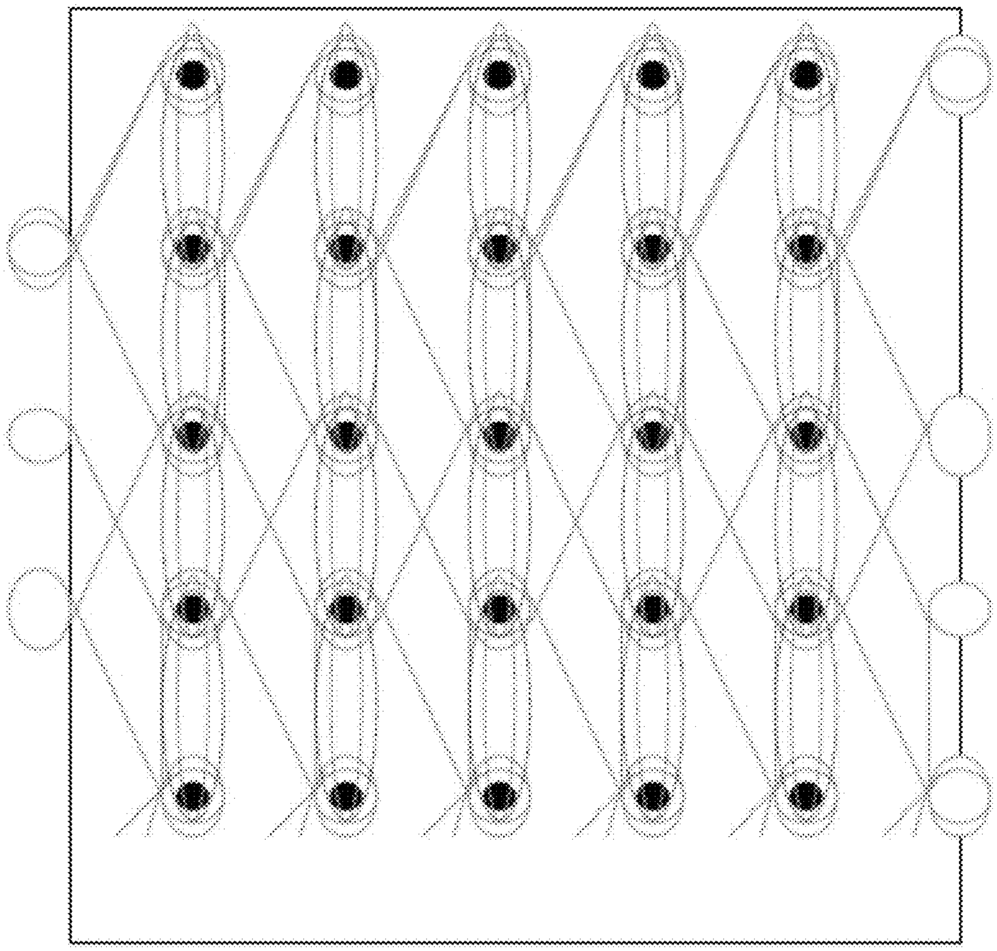
FIGS. 7(*a*)-(*b*) illustrate exemplary stitch-bonding patterns.
Figure 7B:
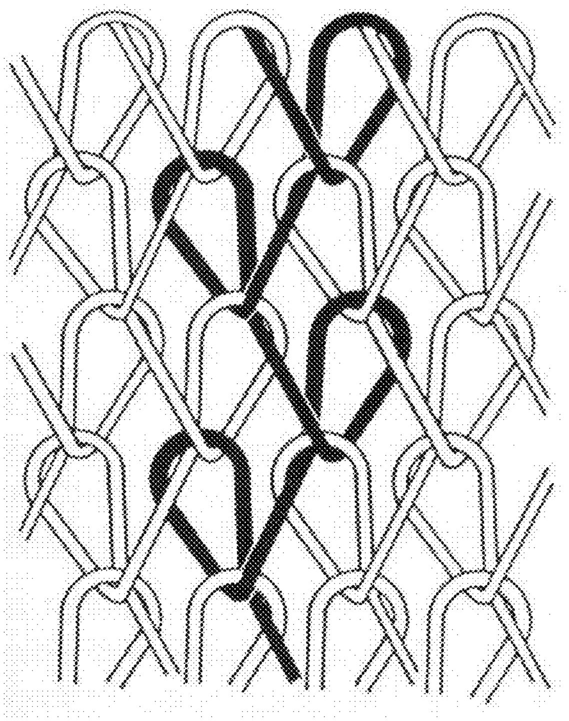

Another suitable type of fabrics is a stitch-bonded structure with a nonwoven substrate or without a substrate, i.e., a knit. An exemplary stitch-bonding pattern is shown in FIG. 7(*a*) is a ripple stitch on the front bar and a simple tricot stitch on the back bar. In one example, the front bar is a (1,0,1,0,1,2,1,2) ripple stitch and the back bar is a (1,0,1,2) tricot stitch. Another suitable stitch pattern such as basic warp knitting is shown in FIG. 7(*b*). Other patterns can be used, such as chain, ripple and tricot stitches and combination thereof can be used.

These fabrics can be used when their properties are within the inventive ranges discussed above. The orientation of these fabrics preferably follows the preferred stretched ranges in the circumferential and longitudinal/axial directions discussed above.

Alternately, a sleeve can be formed in situ on the roller itself using yarns or strings and winding them with low tension. The winding can be diagonal and formed by the crossing of two or more yarn ends, or less diagonal and formed by any convenient number of yarn ends, including a parallel warp of yarns. This in situ formed sleeve can be heat set to attach the yarns or strings at their intersections.

A virtual sleeve, stabilizing the surface can also be formed in situ by printing an open-mesh pattern or any pattern including those described herein on top of the roller. In one example, the in-situ printing is carried out by a 3-D printer. Another in situ sleeve can be formed by transferring a molten mesh from a transfer sheet onto the face of the roller.

A carded web can also be wrapped over a roller cover more than once and flattened over the roller cover. Carded webs have limited circumferentially aligned stretch, and at weights under 30 g/m$^2$ are highly-open structures.

Furthermore, an open mesh can be created on the surface of the roller cover by embossing the roller cover with a heated drum having any pattern discussed herein. The heated drum and the roller cover are rotated against each other and the heated pattern on the heated drum forms the same pattern on the roller cover.

While it is apparent that the illustrative embodiments of the invention disclosed herein fulfill the objectives stated above, it is appreciated that numerous modifications and other embodiments may be devised by those skilled in the art. One such modification is to use different materials with different shapes or absorptive properties than those described above performing in the same manner. Therefore, it will be understood that the appended claims are intended to cover all such modifications and embodiments, which would come within the spirit and scope of the present invention.

We claim:

1. A paint roller cover having a porous sleeve covering installed thereon, wherein the paint roller cover has about a9.5 mm (% inch) or about a 12.7 mm (1/inch) nap or thickness and about 3.81 mm (1.5 inch) inner core diameter and wherein the porous sleeve covering has a circumferential direction and a longitudinal direction, said porous sleeve covering comprises a fabric material having:

a stretch in the circumferential direction of less than 35% at a load of 2 kgf/5 cm, a stretch in the longitudinal direction of less than 125% at a load of 2 kgf/5 cm, wherein in each stretch measurement a strip of the fabric material of 5 cm wide in a relaxed state away from the paint roller cover to be stretched by a force of 2 kgf, and wherein the porous sleeve is dimensioned to compress the paint roller cover from 0.254 mm (10 mils) to 1.27 mm (50 mils), a porosity of greater than 30%, and a thickness from abet 0.15 mm to abet 0.65 mm wherein the stretch in the longitudinal direction of the porous sleeve covering is higher than the stretch in the circumferential direction.

2. The paint roller cover of claim 1, wherein the stretch in the circumferential direction is less than 30% at a load of 2 kgf/5 cm.

3. The paint roller cover of claim 2, wherein the stretch in the circumferential direction is less than 25% at a load of 2 kgf/5 cm.

4. The paint roller cover of claim 3, wherein the stretch in the circumferential direction is less than 15% at a load of 2 kgf/5 cm.

5. The paint roller cover of claim 4, wherein the stretch in the circumferential direction is less than 10% at a load of 2 kgf/5 cm.

6. The paint roller cover of claim 1, wherein the stretch in the longitudinal direction is less than 100% at a load of 2 kgf/5 cm.

7. The paint roller cover of claim 6, wherein the stretch in the longitudinal direction is less than 75% at a load of 2 kgf/5 cm.

8. The paint roller cover of claim 7, wherein the stretch in the longitudinal direction is less than 60% at a load of 2 kgf/5 cm.

9. The paint roller cover of claim 1, wherein the porosity is more than 40%.

10. The paint roller cover of claim 9, wherein the porosity is more than 50%.

11. The paint roller cover of claim 1, wherein the thickness is from 0.20 mm to 0.51 mm.

12. The paint roller cover of claim 11, wherein the thickness is from 0.20 mm to 0.38 mm.

13. The paint roller cover of claim 1, wherein a diagonal stretch of the fabric material is preferably from 30% to about 75%, at a 2 kgf/5 cm load.

14. The paint roller cover of claim 1, wherein a basis weight between 10 about 30 g/m$^2$.

15. The paint roller cover of claim 1, wherein the fabric material is synthetic, polymeric or non-natural.

16. The paint roller cover of claim 1, wherein the fabric material is hydrophobic.

17. The paint roller cover of claim 1, wherein the fabric material comprises continuous filament fibers.

18. The paint roller cover of claim 1, wherein the fabric material is selected from a group consisting of a knit sock; a knit sleeve; a continuously formed plastic mesh tube; a porous open foam tube; a tubular mesh of diagonally positioned or crossed yarns meshing; a woven; a knit; a cross-over-bonded fabric; a perforated film; a perforated nonwoven; and a stitched bonded pattern with or without a nonwoven substrate.

19. The paint roller cover of claim 18, wherein the knit sock is a circular knit sock and is formed with a knit diameter and a knit pattern that allows the sock to expand in diameter as it is being pulled over the paint roller cover, approaching its circumferential stretch limit.

20. The paint roller cover of claim 18, wherein the knit sock is arranged for the looping frequency in the knit in the circumferential direction to be larger than the frequency in the longitudinal direction.

21. The paint roller cover of claim 18, wherein the knit sleeve has different looping frequencies than after it is finished by heat-setting.

22. The paint roller cover of claim 18, wherein the woven or knit has at least one of the repeating spaces in one direction with a frequency higher than 4/inch for a woven fabric or a knit fabric.

23. The paint roller cover of claim 18, wherein the stitched bonded pattern with or without a nonwoven substrate includes at least one of a chain, a ripple, a tricot or a warp stitch or combinations thereof.

* * * * *